(12) United States Patent
Alam (10) Patent No.: US 9,426,265 B1
(45) Date of Patent: Aug. 23, 2016

(54) METHOD AND APPARATUS FOR CONTROLLING A PROJECTOR ANGLE

(71) Applicant: Wireless Mobi Solution, Inc., San Diego, CA (US)

(72) Inventor: Mohammed Didarul Alam, San Diego, CA (US)

( * ) Notice: Subject to any disclaimer, the term of this patent is extended or adjusted under 35 U.S.C. 154(b) by 0 days.

(21) Appl. No.: 14/666,682

(22) Filed: Mar. 24, 2015

(51) Int. Cl.
- *H04B 7/00* (2006.01)
- *H04M 1/02* (2006.01)
- *H04N 9/77* (2006.01)

(52) U.S. Cl.
CPC .......... *H04M 1/0272* (2013.01); *H04M 1/0264* (2013.01); *H04N 9/77* (2013.01)

(58) Field of Classification Search
CPC ..... H04M 1/0272; H04M 1/0264; H04N 9/77
USPC .......................... 455/73, 66.1, 39, 556.1, 557
See application file for complete search history.

(56) References Cited

U.S. PATENT DOCUMENTS

| | | | | |
|---|---|---|---|---|
| 2008/0166438 A1* | 7/2008 | Zhao | ............ | A61K 31/35 424/744 |
| 2012/0058725 A1* | 3/2012 | Pan | ............ | G06F 3/147 455/41.2 |
| 2013/0113975 A1* | 5/2013 | Gabris | ............ | G03B 17/54 348/333.1 |
| 2015/0069249 A1* | 3/2015 | Alameh | ............ | G01J 1/0407 250/341.7 |
| 2015/0123989 A1* | 5/2015 | Aragaki | ............ | G02B 27/1046 345/619 |

* cited by examiner

*Primary Examiner* — Tuan Pham
(74) *Attorney, Agent, or Firm* — Garrett James O'Sullivan; Timothy Marc Shropshire; Mu Patents (57) ABSTRACT

A system and its design variations use an innovative organic mirror tube to generate the flexible bending light and expose a multipurpose mobile projector. The goal has two folds: first, to provide the flexibility for wall projection angle, in order to ease the operation and second, to further create a foundation for potential naked eye 3D direct observations. The key component used is a silicon-based organic mirror, which can bend the light within the multiple layers of organic hydro gel. Different shaped optical pigtails are designed to match the multiple use cases. One of the many sample implementations using a flat mirror is described in details. The synthetic manufacture procedures are given in details.

8 Claims, 8 Drawing Sheets

METHOD AND APPARATUS FOR CONTROLLING A PROJECTOR ANGLE

BACKGROUND OF THE INVENTION

1. Field of the Invention

The present patent application generally relates to lighting technologies but more specifically to a system and method that uses an organic mirror tube as a mobile projector header, as means to bend light, and lastly, as means to increase the usage flexibility.

2. Description of the Related Art

Size is the main issue, preventing the mobile projector to have the usage flexibility, mainly the module size and shape for the LED light. The DMD driver part is fixed due to the basic light path structure. In the current product design, it forces the module to be placed parallel to the smart phone, and perpendicular to the wall. However, our preliminary user trial conducted concluded that the projection should be perpendicular to the smart phone, or in other words, the projection phone should be parallel to the wall, such that the user can see both the screen and the image on the wall at the same time, to ease the operation. This also allows the user to not have to "nod the head" all the time. There is one invention that uses the fiber optical cable[1] to separate the projection header from the conventional bulky desktop projector; however, the glass fiber used there is not flexible enough to be adopted in a smart phone situation. There are flexible plastic [2] or stiff glass [3] fiber solutions to assist the medical operation but it only transmits light and small images. All these patents are traditional systems, where there are some limitations on the mechanical size or image size. With an organic mirror tube scheme, not only is the image size increased, but also the physical space is saved.

[1] William J. Prysner, "Fiber-optic viewgraph projector", U.S. Pat. No. 5,208,891A, May 4, 1993.
[2] THOMPSON, Christopher, C.; OU, Amy; LENGYEL, Balazs; CAMACHO, Andrew; JIRAPINYO, Pichamol, "System and method for part-task training box for flexible endoscopy", US20140370474A1, Dec. 18, 2014.
[3] Jiro Hirano, Tsuneshige Miyauchi, Kunihiro Mukai, Ryuji Tatsumi, Atsufumi Ueki, Shogo Yoshikawa, "Stereoscopic microscope with graded index fiber objective lenses", U.S. Pat. No. 3,655,259A, Apr. 11, 1972.

With the fast pace of the commercialization of mobile devices, the continuing expansion of visible light sensors and the increasing usage of multimedia presentations, the projection demand has seen a steady increase. Researchers are diligently working towards disruptive technology that has not been previously given substantial attention, including 3D scanners, visible light 3D projections, virtual keyboards, virtual mice, virtual Internet of Things gesture recognition and virtual signature pen applications, etc.

As an essential requirement for projection systems, the organic mixed mirror header for mobile devices with flexible flat and curved tubes have been developed. The conventional projector system needs a glass fiber system. However, the new system utilizes organic hydro silicon gel header, which can move the flat or curved mirror around without any difficulty. This greatly enhances the flexibility for virtual projectors, keyboards, mice, pen designs, and allows the multiple accessory options for the end user.

In addition, it can be used in similar portable devices such as professional helmets as well.

SUMMARY OF THE INVENTION

An idea of an organic mirror substance along with its add-on header style or integrated realizations on a mobile device is disclosed. The manufacture process is also new, and it was not found in any prior arts, mainly because that this any angle projection feature of the smart phone itself is new. There is no previous need to bend entire wide screen projection image on to the wall or into the eye at any angle. The prior art substance such as glass is not flexible enough to be reused here, the flexible one like plastic is not transparent enough, pure organic substance is flexible and transparent, it does bend that light, but doesn't guide the entire image forward without the blurring the projection, and it doesn't last long, the only way to manufacture the substance that is flexible, transparent, keep the light ray in its original order is by following the exact steps in this invention, especially the ingredient formula, which is carefully tested in the laboratory.

DETAILED DESCRIPTION OF THE INVENTION

With reference to FIGS. 1-8 shown above, reference will now be made in detail to a preferred embodiment of the system and the method for an organic mirror tube header with an intelligent mobile device disclosed in the present patent application, examples of which are also provided in the following description. Exemplary embodiments of the projector system and method disclosed in the present patent application are described in detail. It will also be apparent to those skilled in the relevant art that some features are not particularly important to have an understanding of the system and the method may not be shown for the sake of clarity.

Furthermore, it should be understood that the flexible projection angle system and method disclosed in the present patent application is not limited to the precise embodiments described below and that various changes and modifications may be affected by one skilled in the art and within the spirit or scope of the projection. For example, elements and/or features of different illustrative embodiments may be combined with each other and/or substituted for each other within the scope of this disclosure.

Figure 7:
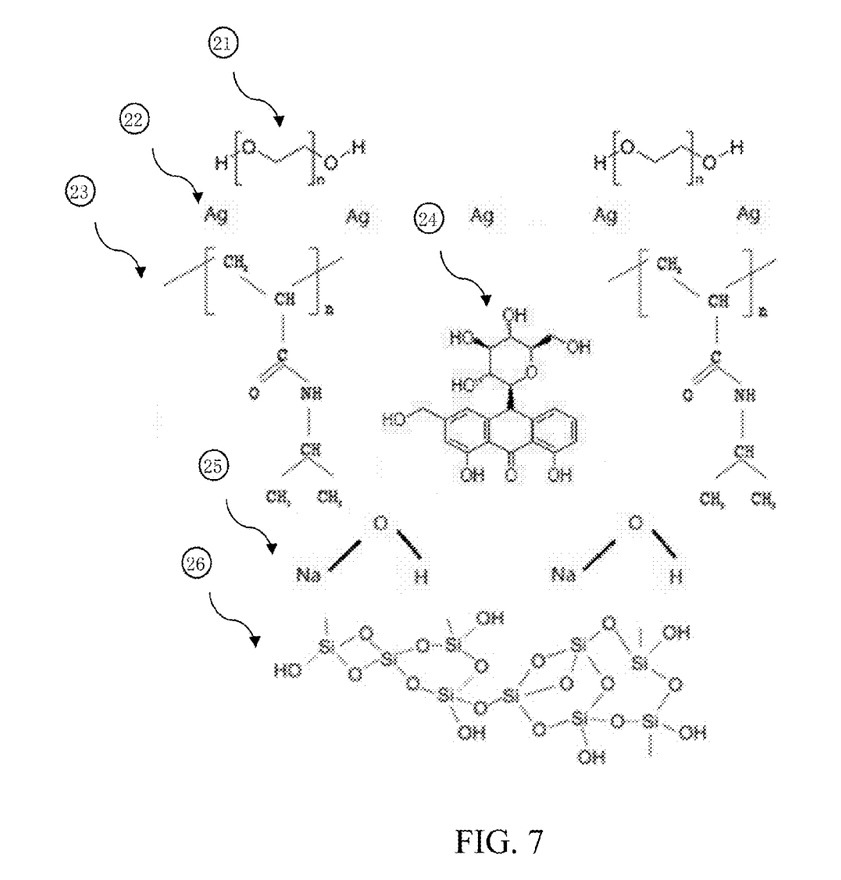
FIG. 7 depicts the main molecules of the organic mirror substance, according to an embodiment of the present invention.

Embodiments of the present patent application described hereafter present a flexible angle projector system coupled with a detachable organic mirror tube header accessories, indicated in FIGS. 1 to 4 by circles 2/5/8/11. The exact mobile devices for this purpose in the network have been developed. Organic hydro silicon gel, indicated in FIG. 7, is used for making this accessory for two reasons. First, organic material provides fast heat dissipation and second, passes light with minimal loss. In other words, it passes on energy easily.

Figure 1:
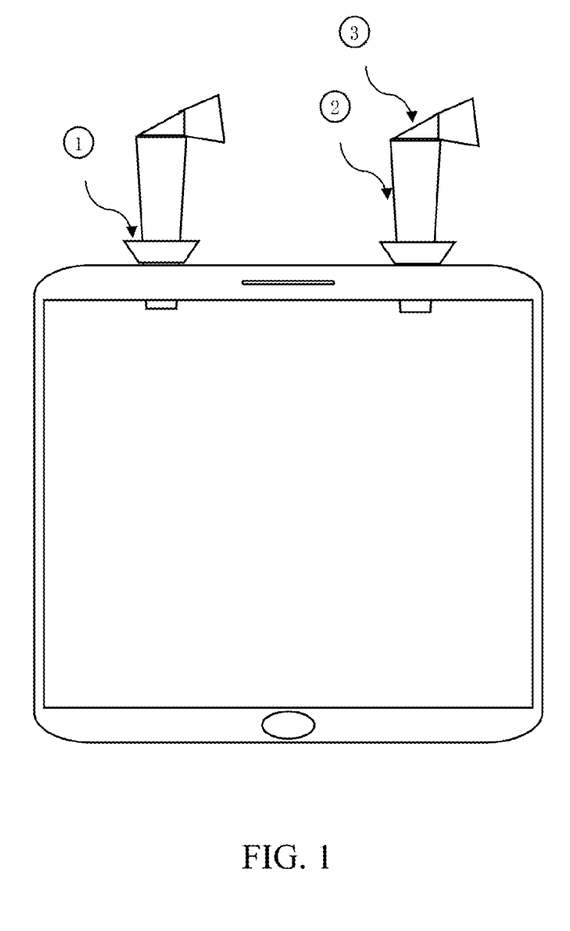
FIG. 1 is a diagram illustrating a hardware system that implements a flat shaped mirror tube header for intelligent mobile devices, according to an embodiment of the present invention.
Figure 2:
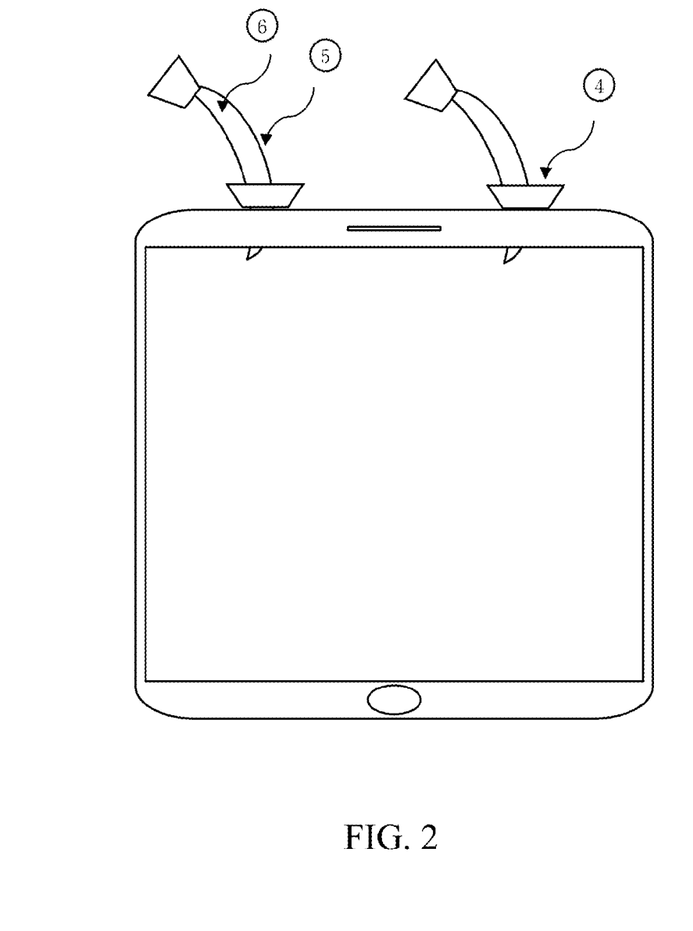
FIG. 2 is a diagram illustrating a hardware system that implements a curved shaped mirror tube header for intelligent mobile devices, according to an embodiment of the present invention.
Figure 3:
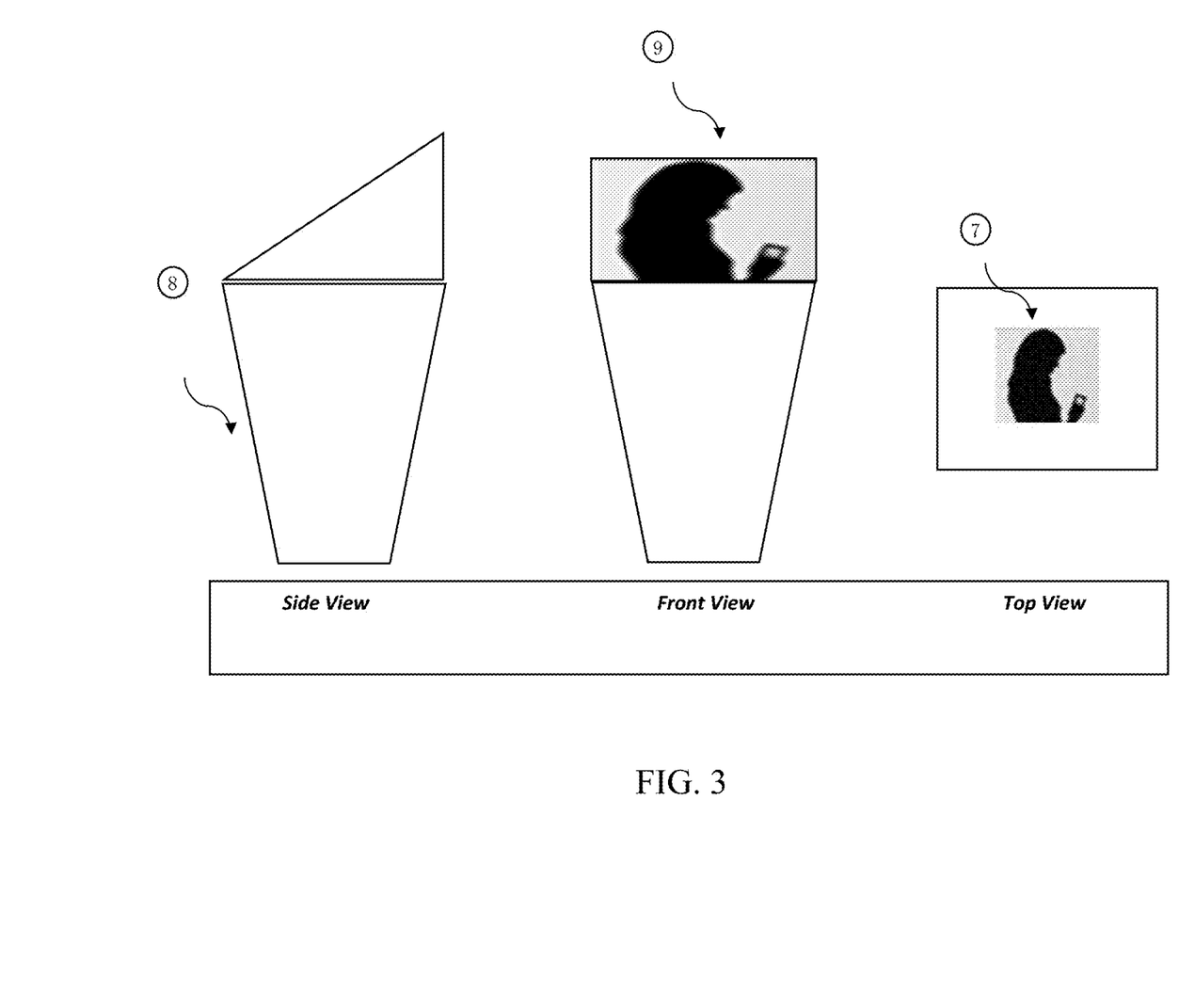
FIG. 3 illustrates the internal structure of the mirror header, according to an embodiment of the present invention.
Figure 4:
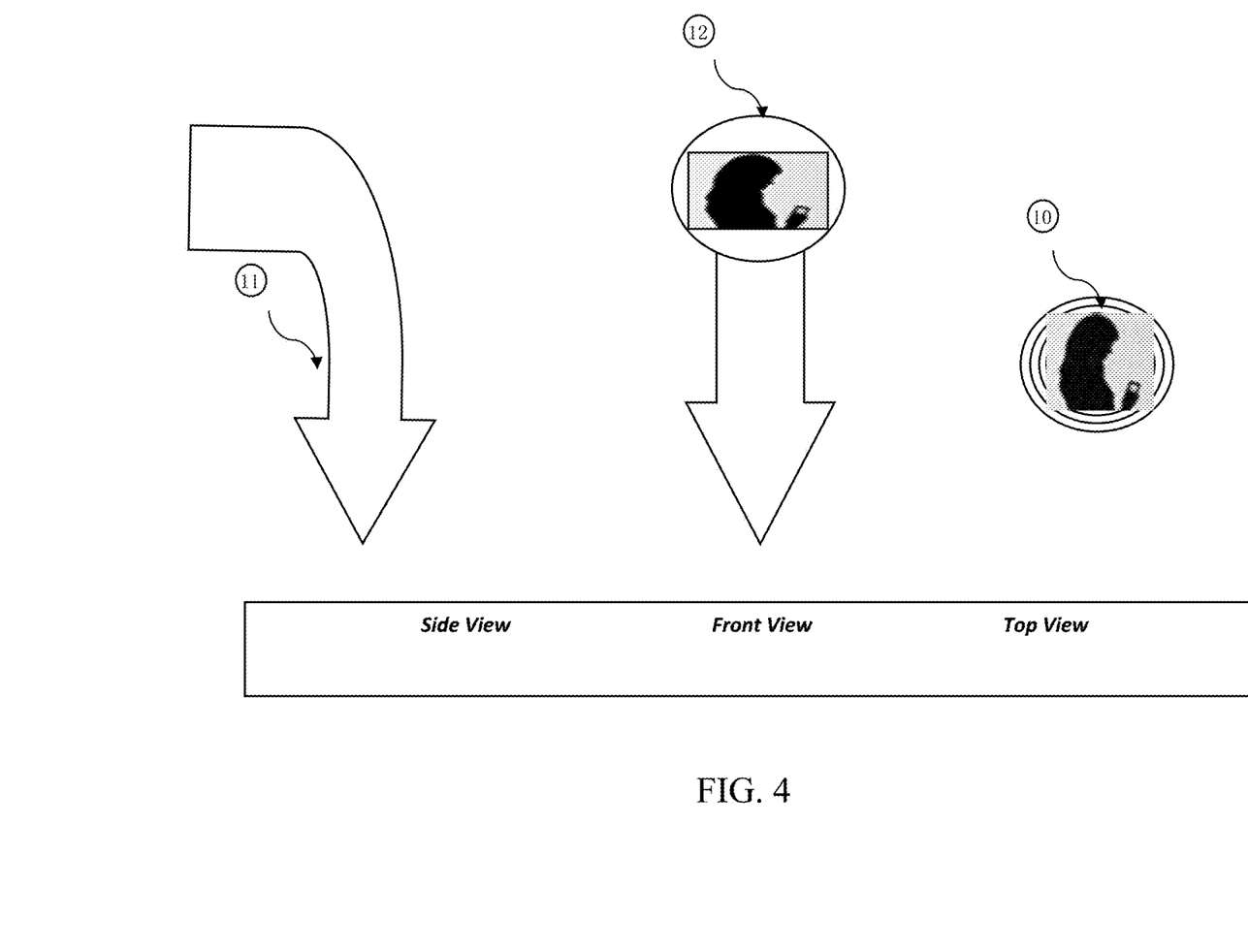
FIG. 4 illustrates a projector combined with the curved shaped mirror header, according to an embodiment of the present invention.
Figure 5:
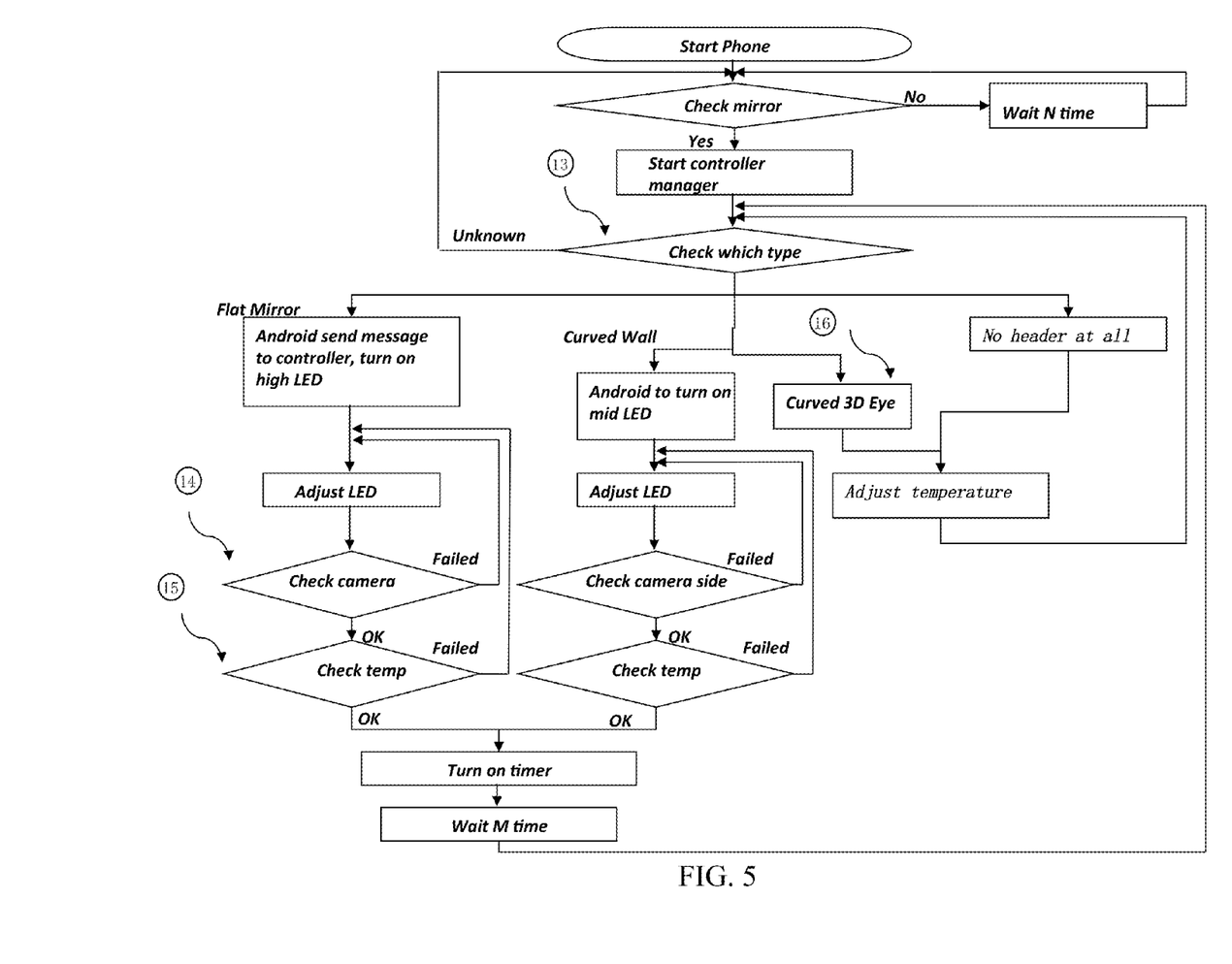
FIG. 5 illustrates the software control flow diagram of the projector, according to an embodiment of the present invention.

There are two variation, the first variation is essentially to use a micro mirror circle 3 in FIG. 1 or circle 9 in FIG. 3 to bounce the light once, and project the image on the wall, the second variation uses the multi-layered curved mirror shield circle 6 in FIG. 2 or circle 12 in FIG. 4 to guide the light many times to project on to the wall or into the eye directly. The first variation interface with existing technology much easy than the second one, since the light gets bounced only once, as long as we keep the mirror as flat as possible to ensure the image is not distorted. The second variation, the light gets bounced a number of times, depends on bending degrees, on the curved mirror shield, the distortion will happen, it relies on the camera indicated by circle 18 in FIG. 6 to calibrate the distortion, and correct accordingly. The cost is additional computation time in circle 20 controller on FIG. 6, the benefit is the flexibility of the angle it provides, on top of the original fixed projector indicated by circle 1 on FIG. 1 or circle 4 on FIG. 2.

Figure 6:
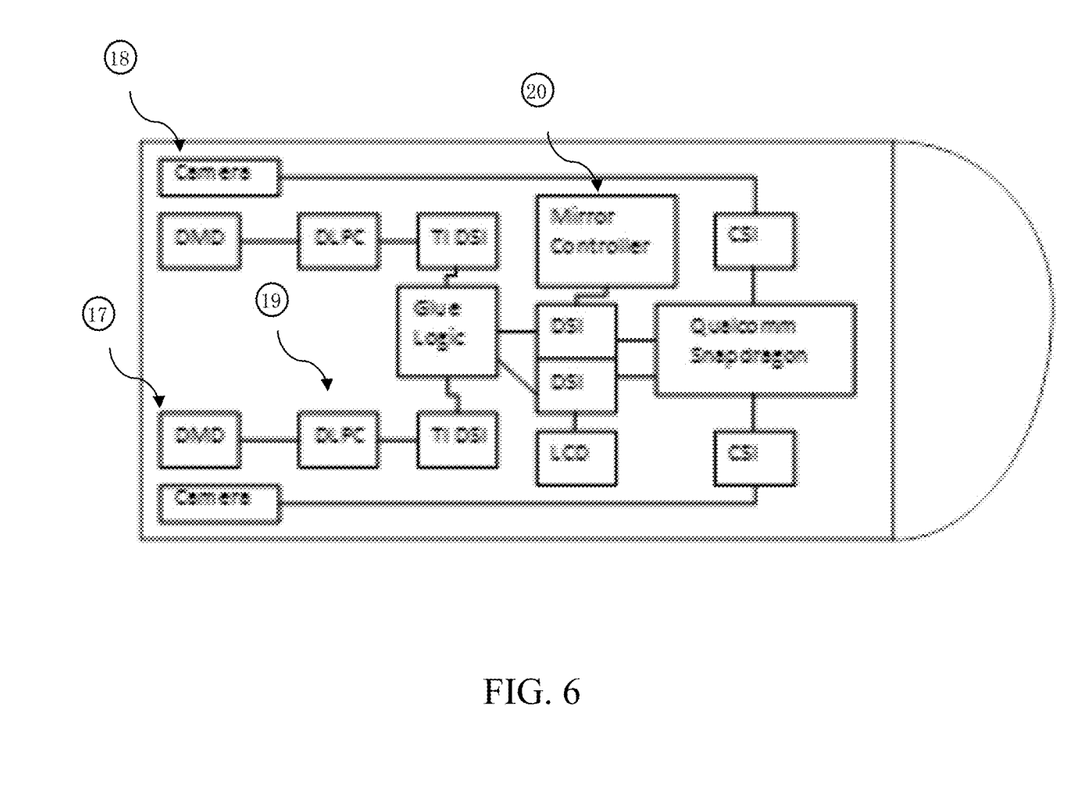
FIG. 6 illustrates the PCB layout of the mother board with major DSI/CSI interfaces, according to an embodiment of the present invention.

The calibration process is the LED will scan the whole screen line by line through DMD circle 17 on FIG. 6, like the traditional TV odd even line principal, then the camera circle 18 on FIG. 6 will report the position of the pixel scanned on the wall, record an internal projected map in circle 20 on FIG. 6, comparing with the standard map, and adjust the position on next calibration scan cycle, until all the pixel are corrected shown up on the wall. It is quite similar to the printer self-calibration process, after you change the ink cartridge.

The organic material comes from two sources, one from nature and the other, man-made. The natural source is *Aloe*, a genus containing over 500 species of flowering succulent plants. The most widely known species is *Aloe Vera*. *Aloe* pulp indicated by the circle 24 on FIG. 7 is extracted and processed to obtain *Aloe* gel. The acquired *Aloe* gel has a natural heat dissipating capability that is centered around 27 degrees F.

The basic processing procedure is as follows:
1. First heat *Aloe* gel to 55±10 degrees, for 20±5 minutes,
2. Compress it at 10±2 MPa pressure, for 30±5 minutes,
3. Add Sodium Hydroxide indicated by the circle 25 on FIG. 7,
4. Wait 40±5 minutes, until raise the PH value to 9±1,
5. Check the transmittance every 10±5 minutes, then mix it with
6. 45-65% of Silica solution indicated by the circle 26 on FIG. 7, for 25±5 minutes,
7. Add 5-15% of N-isopropyl acrylamide powder by the circle 23 on FIG. 7, for 10±5 minutes,
8. Heat it again to 65±5 degrees until dry, for 70±10 minutes,
9. Cut it into the desired shape and deposit
10. The silver indicated by the circle 22 on FIG. 7 onto the flat surface, for 60±10 minutes,
11. Using the typical nano-scale chemical vapor deposition method, check every 5±2 minutes,
12. To ensure the uniform coating,
13. Roll up the sheet to desired shape,
14. Spray painting the final tube header with Glycol 600 indicated by the circle 21 on FIG. 7.

Note that the step 12 is different from normal process, the coating should be thin, but leave no blank area, that allows the light go through, otherwise the light will leak into next layer, the picture will become blur. The last step is applying a transparency flexible fire-retardant coating such as Polyethylene to seal the unit. This last step provides the durability for the end user, preventing the water damage, only specified material is recommended, the coating has to be transparent, flexible, durable, heat friendly, anti-static, all at the same time, if the manufacture process is not tightly controlled, the material made will not meet above contradictory features.

The flat mirror tube circle 2 on FIG. 1 and circle 9 on FIG. 3 is made based on the above procedure. The light comes from circle 7 on FIG. 3, and gets reflected on circle 9 once. The curved organic mirror tube circle 5 on FIG. 2 and circle 12 on FIG. 4 is made in two steps based on the above process. The first step is to make a flat thin sheet. Then roll the sheet up to form a spiral tube, as shown by circle 10 on FIG. 4, the thickness of the sheet can be as small as 0.005 mm. The thinner the sheet is, the higher the cost of manufacturing it, and the better the resolution. Since the light will not be mixed up with each other as they are guided in between the sheets while coming out of the spirally layered tube. The roll pattern can be oval shaped instead of a round one to further fit the macula—retina structure. Any other ergonomic shape is allowed to form a set of pigtails.

Temperature balance techniques are provided according to one broad aspect of the present patent application and may be used to enhance the user experience. According to an embodiment of the present patent application, the final temperature is adjusted through the sensor indicated by circle 19 on FIG. 6 to effectively match with the type of mirror attached to the phone, as shown by circle 16 on FIG. 5. A compromise must be made between the size of image and the flexibility, as shown by circle 14 on FIG. 5. For example, different seasons can be associated with different temperature ranges, as shown by circle 15 on FIG. 5. In winter time, the stronger light that is used, the bigger the image.

The organic mirror principles disclosed herein are also substantially independent of system architectures and may be used for virtually all embedded devices that need this light image bending control, such as Medical Devices or Internet of Things.

One basic rule which could be implemented in accordance with an implementation of the embodiments of the present patent application is when the temperature becomes too high, bigger mirrors out of a pigtail set can be swapped in.

The specific type of each component will be implementation-dependent. The particular structure and operation of the organic mirror tube pairs may be different for different formats of mechanical designs.

In addition, the present patent application is in no way restricted to implementation with mobile devices or other types of device having the specific structure shown in the drawings. Different or fewer components, with different sensor interconnections may be used in a device in which an implementation of the present patent application can be done.

Figure 8:
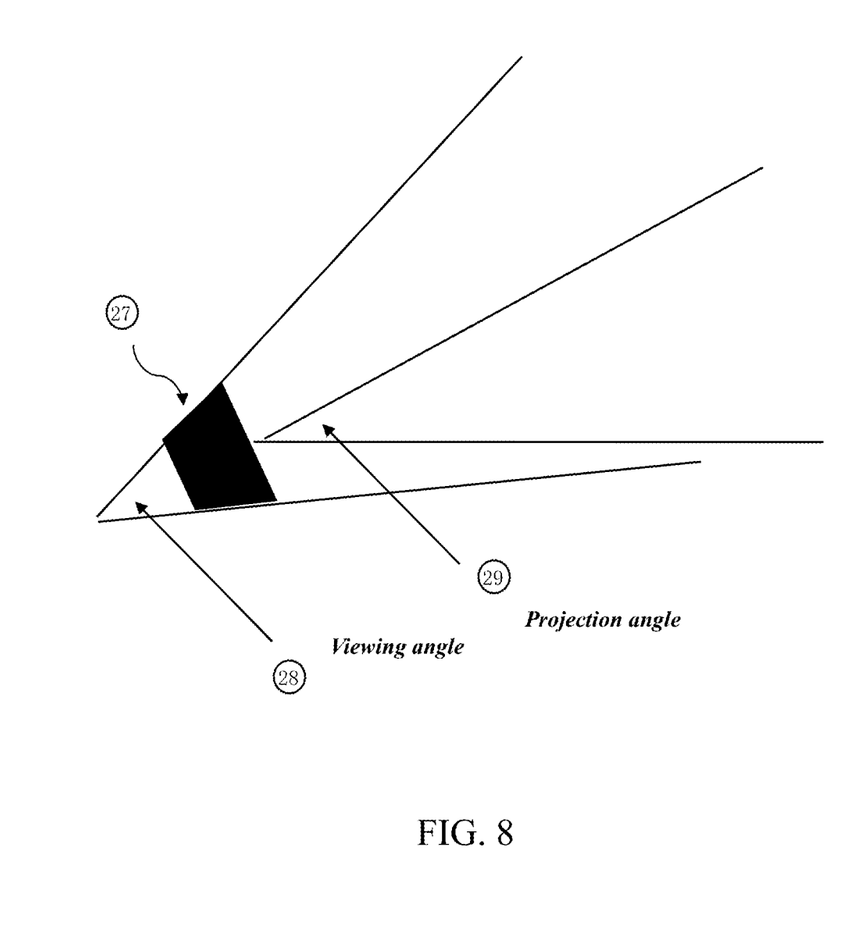
FIG. 8 depicts the projection header angle and viewing angle, according to an embodiment of the present invention.

According to another embodiment, the organic mirror device circle 27 as indicated on FIG. 8 can be incorporated within the phone in a sliding design fashion, such that when the projector function is not used, the tube(s) can be pushed inside the phone. The downside of this design is that you cannot swap with different tube(s) for different viewing angles as indicated circle 28 on FIG. 8. However, you can still pull out the tube to have different projection angles as indicated circle 29 on FIG. 8. The projection angle is defined as the angle between the middle projection line to the horizontal and the viewing angle is defined as the angle between upper and lower projection lines.

In one prototype system, part of the projector is sourced from the TI DLP6401 processor and the glue logic can be any vendor's product. We recommend the CogniVue 96 CPU array. Both the WiFi and LTE functionality is from the Qualcomm Snapdragon family and the lighting warming thermal resistor pair is from MicroChip.

Many different types of implementation and realization of the present patent application are possible, e.g. the camera circle 18 on FIG. 6 can be included to detect the human eye. Once the eye is detected, the LED light intensity is lowered immediately to protect the user from eye injury, as shown by circle 13 on FIG. 5, while the direct eye viewing option automatically turns on.

Other different types of implementation and realization of the present patent application are possible, e.g., the thermal resistor can be included to detect the temperature on the printed circuit board (PCB), as shown by circle 19 on FIG. 6. Once the hot reflected radiation is detected from the detachable pigtail accessory, the organic mirror controller is kicked off to adjust the LED strength and to lower the radiation or remind the user to switch the size of the pigtail and viewing angles immediately to protect the PCB from excessive heat damage.

Components or devices described as hardware (above) may alternatively be implemented partially in application software. Similarly, method steps disclosed herein may be performed by hardware or coded in software modules.

The embodiments, according to application situations, effectively allow the projection angle to switch devices as one of the options. It does so with the organic mirror pair. The unique methodology is optimized for projectors with variable LED strength that can be adapted to wider or narrow viewing angles. All embedded lighting feedback controlling firmware system implementations are supported with camera sensors.

While the present patent application has been shown and described with particular references to a number of embodiments thereof, it should be noted that various other size changes or parameter modifications may be made without departing from the scope of the present invention.

I claim:

1. A system designed for light reflecting or light bending with organic silicon hydro gel and thermal resistors, the system comprising:
   a. a mirror tube header device at an outside edge of a mobile device having a printed circuit board, wherein the mirror tube header comprises organic material formed from a multi-step treatment of a gel selected from the group consisting of: *Aloe* gel, a synthetic hydro gel, and a nanostructure silicon gel, wherein the *Aloe* gel is obtained from one or more plants, wherein the multi-step treatment comprises the steps of:
      i. heating the *aloe* gel to a temperature of 55±10 degrees Fahrenheit for a duration of 20±5 minutes;
      ii. compressing the heated *aloe* gel to 10±2 MPa pressure for a durations of 30±5 minutes;
      iii. adding Sodium Hydroxide to the compressed heated *aloe* gel to form a mixture;
      iv. waiting until the mixture has a PH value of 9±1;
      v. checking the transmittance in 10±5 minute increments;
      vi. adding 45-65% of Silica solution to the mixture;
      vii. adding 5-15% of N-isopropyl acrylamide powder to the mixture;
      viii. heating the mixture to 65±5 degrees Fahrenheit, wherein heating the mixture to 65±5 degrees Fahrenheit dries the mixture;
      ix. depositing the mixture onto the flat surface;
      x. rolling the mixture into a shape;
      xi. painting the shape; and
   b. at least one temperature sensor,
   wherein the at least one temperature sensor is configured to determine at least one current environment parameter, wherein the mirror tube header device is coated with silver vapor, wherein the mirror tube header device has the PEG600 family seal affixed thereto, wherein a flat construction can be for a straight forward reflecting tube or a curved roll up tube to bend a light, and wherein an operating mode of an inside lighting device is configured to operate according to a boundary heating environment.

2. The system of claim 1, wherein a projecting device is configured to sense the environment conditions with at least one thermal resistor sensor.

3. The system of claim 2, further comprising a camera device and at least one camera sensor configured to perform calibration checkups of the correctness of a projected image on a wall through the mirror tube header device and to form a closed loop automated image lighting intensity adjustment system.

4. The system of claim 3, wherein the mobile device is configured to perform at least one routine to sense a type of the mirror tube header device by using the camera and simultaneously judging the viewing angle, and wherein the mobile device is also configured to adjust a lighting condition according to a sensed temperature or to remind a user to switch a pigtail with a message.

5. The system of claim 1, wherein the light reflecting or bending device and each of the devices are configured to form a certain imaging resolution pattern.

6. The system of claim 5, wherein the projecting device and the mobile device are operate in a mode selected from the group consisting of a wall projection mode and an eye projection mode.

7. The system of claim 5, wherein the device has a wall projecting mode and a direct 3-D eye observation mode, wherein in the wall projecting mode, the device is configured to operate at high LED lighting conditions, and wherein in the direct 3-D eye observation mode, the device is configured to operate at a low LED light condition.

8. The system of claim 1, wherein the projecting device is integrated in the mobile device.

* * * * *